(12) United States Patent
Desjardins (10) Patent No.: US 12,104,541 B1
(45) Date of Patent: Oct. 1, 2024

(54) METHOD AND SYSTEM FOR ASSEMBLING A REDUCTION GEARBOX

(71) Applicant: Pratt & Whitney Canada Corp., Longueuil (CA)

(72) Inventor: Michel Desjardins, St Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/195,334

(22) Filed: May 9, 2023

(51) Int. Cl.
*F02C 7/36* (2006.01)

(52) U.S. Cl.
CPC ............ *F02C 7/36* (2013.01); *F05D 2230/64* (2013.01); *F05D 2260/40311* (2013.01)

(58) Field of Classification Search
CPC ....... F05D 2260/40311; F05D 2230/64; F02C 7/36; F16H 3/666; Y10T 29/4932; Y10T 29/49465; Y10T 29/49895; Y10T 29/49901
See application file for complete search history.

(56) References Cited

U.S. PATENT DOCUMENTS

| | | | |
|---|---|---|---|
| 5,864,950 A | 2/1999 | Harata | |
| 7,507,180 B2 | 3/2009 | Robuck | |
| 8,235,861 B2 | 8/2012 | Lopez | |
| 8,763,251 B2 | 7/2014 | Mccune | |
| 10,487,917 B2 | 11/2019 | Chmylkowski | |
| 10,533,451 B2 | 1/2020 | Klaus | |
| 10,533,636 B2 | 1/2020 | Lundbäck | |
| 10,724,445 B2 | 7/2020 | Sheridan | |
| 11,022,045 B2 | 6/2021 | Niepceron | |
| 11,118,535 B2 | 9/2021 | Van Der Merwe | |
| 11,118,671 B2 | 9/2021 | Simon | |
| 11,174,782 B2 | 11/2021 | Desjardins | |
| 11,225,912 B2 * | 1/2022 | Mitrovic | ................. F02C 3/145 |
| 11,339,725 B2 | 5/2022 | Simon | |
| 11,492,979 B2 | 11/2022 | Beck | |
| 11,499,623 B2 | 11/2022 | Di Giovanni | |
| 11,542,829 B2 | 1/2023 | Facchini | |
| 11,591,972 B2 | 2/2023 | Beck | |
| 11,608,785 B2 | 3/2023 | Simon | |
| 11,635,029 B2 | 4/2023 | Desjardins | |

(Continued)

FOREIGN PATENT DOCUMENTS

DE 102018130801 A1 6/2020

*Primary Examiner* — Jason L Vaughan
(74) *Attorney, Agent, or Firm* — Getz Balich LLC (57) ABSTRACT

A method of assembling a reduction gearbox is provided that includes: a) aligning first and second ring gears by mounting the first ring gear in a first casing section in a first predetermined position and mounting the second ring gear in a second casing section in a second predetermined position, wherein the first and second casing sections mate with one another in a defined orientation; b) angularly aligning a plurality of planet gear assemblies relative to one another, each planet gear assembly having a main gear, a first lateral gear, and a second lateral gear coupled to one another; c) disposing the aligned planet gear assemblies between the first and second casing sections; and d) coupling the first and second casing sections together in the defined orientation with the first lateral gears meshed with the first ring gear and the second lateral gears meshed with the second ring gear.

17 Claims, 10 Drawing Sheets

(56) References Cited

U.S. PATENT DOCUMENTS

| | | | |
|---|---|---|---|
| 11,686,255 B2 * | 6/2023 | Simon | F02K 1/827 |
| | | | 29/893.1 |
| 2020/0025278 A1 | 1/2020 | Lundbäck | |
| 2020/0332721 A1 * | 10/2020 | Simon | F16H 1/28 |
| 2021/0010427 A1 * | 1/2021 | Niepceron | F02K 3/072 |
| 2021/0388770 A1 | 12/2021 | Hrubec | |
| 2022/0145769 A1 | 5/2022 | Mouly | |
| 2022/0235699 A1 | 7/2022 | Desjardins | |
| 2023/0019277 A1 | 1/2023 | Frantz | |

* cited by examiner

METHOD AND SYSTEM FOR ASSEMBLING A REDUCTION GEARBOX

BACKGROUND OF THE INVENTION

1. Technical Field

The application generally relates to aircraft engines and, more particularly, to gearboxes used in an aircraft engine such as a gas turbine engine.

2. Background Information

Turboprops are gas turbine engines coupled to a propeller via a reduction gearbox. Contrary to a turbofan engine, in which energy from the jet is used to generate thrust, a turboprop turbine converts this energy in mechanical energy. The turbine is then used to drive the propeller. However, the rotational speed of the turbine is too high to be directly coupled to the propeller. Accordingly, a reduction gearbox is used to reduce the rotational speed of the propeller relative to the turbine and to increase the torque generated by the turbine. Gearboxes add weight and complexity to the engine, and room for improvement exists.

SUMMARY

According to an aspect of the present disclosure, a method of assembling a reduction gearbox is provided that includes: a) aligning a first ring gear with a second ring gear by mounting the first ring gear in a first casing section in a first predetermined position and mounting the second ring gear in a second casing section in a second predetermined position, wherein the first casing section and second casing section are configured to mate with one another in a defined orientation; b) angularly aligning a plurality of planet gear assemblies relative to one another, each planet gear assembly having a main gear, a first lateral gear, and a second lateral gear coupled to one another; c) disposing the aligned planet gear assemblies between the first casing section and second casing section; and d) coupling the first casing section and second casing section together in the defined orientation with the first lateral gears meshed with the first ring gear and the second lateral gears meshed with the second ring gear.

In any of the aspects or embodiments described above and herein, the first ring gear may be aligned with the second ring gear when the first casing section and second casing section are mated in the defined orientation.

In any of the aspects or embodiments described above and herein, the first ring gear (FRG) may include a FRG alignment feature and the first casing section (FCS) may include an FCS alignment feature. In the first predetermined position, the FRG alignment feature and the FCS alignment feature may be aligned with one another. The second ring gear (SRG) may include an SRG alignment feature and the second casing section (SCS) may include a SCS alignment feature. In the second predetermined position, the SRG alignment feature and the SCS alignment feature may be aligned with one another.

In any of the aspects or embodiments described above and herein, in the defined orientation with the first casing section and second casing section mated with one another, the first ring gear and the second ring gear may be aligned to receive the plurality of planet gear assemblies.

In any of the aspects or embodiments described above and herein, the FRG alignment feature and the FCS alignment feature may be visually identifiable.

In any of the aspects or embodiments described above and herein, the SRG alignment feature and the SCS alignment feature may be visually identifiable.

In any of the aspects or embodiments described above and herein, the first ring gear and the first casing section may be mechanically engaged with one another, and the second ring gear and the second casing section may be mechanically engaged with one another.

In any of the aspects or embodiments described above and herein, a first set of teeth may mechanically engage the first ring gear and the first casing section, and a second set of teeth may mechanically engage the second ring gear and the second casing section.

In any of the aspects or embodiments described above and herein, the step of angularly aligning the plurality of planet gear assemblies relative to one another may include connecting each planet gear assembly to a coupler.

In any of the aspects or embodiments described above and herein, the plurality of planet gear assemblies may include N number of planet gear assemblies, wherein N is an integer greater than one. The coupler (CPL) may include an N number of CPL alignment features, wherein each respective one of the N number of CPL alignment features is associated with a respective one of the N number of planet gear assemblies, and each planet gear assembly (PGA) may include a PGA alignment feature. The step of angularly aligning the plurality of planet gear assemblies relative to one another may include connecting each planet gear assembly to the coupler when each respective CPL alignment feature is aligned with the PGA alignment feature of the associated said planet gear assembly.

In any of the aspects or embodiments described above and herein, the CPL alignment features and the PGA alignment features may be visually identifiable.

In any of the aspects or embodiments described above and herein, the coupler may be a planet carrier or an assembly jig.

According to an aspect of the present disclosure, a system for assembling a reduction gearbox is provided. The system includes a casing, first and second ring gears, a plurality of planet gear assemblies, and a coupler. The casing includes a first casing section (FCS) that mates with a second casing section (SCS). The first casing section includes an FCS alignment feature and the second casing section includes an SCS alignment feature. The first and second casing sections are configured to mate in a defined orientation. In the defined orientation, the FCS alignment feature and the SCS alignment feature are aligned with one another. The first casing section includes a first casing ring gear alignment feature and the second casing section includes a second casing ring gear alignment feature. The first ring gear (FRG) is configured for mechanical engagement with the first casing section. The first ring gear has an FRG alignment feature. The second ring gear (SRG) is configured for mechanical engagement with the second casing section. The second ring gear has an SRG alignment feature. In the defined orientation, the first ring gear is engaged with the first casing section with the first casing ring gear alignment feature and the FRG alignment feature are aligned with one another, and the second ring gear is engaged with the second casing section with the second casing ring gear alignment feature and the SRG alignment feature are aligned with one another. Each of the planet gear assemblies (PGA) has a main gear, a first lateral gear, a second lateral gear coupled to one another. Each planet gear assembly (PGA) includes a PGA alignment feature. The coupler (CPL) is configured to angularly align the plurality of planet gear assemblies relative to one another. The coupler has a CPL alignment feature for each respective planet gear assembly that is distinguishable from the CPL alignment feature for the other planet gear assemblies. The planet gear assemblies are angularly aligned when the CPL alignment feature for each respective planet gear assembly is aligned with the PGA alignment feature for that respective planet gear assembly.

In any of the aspects or embodiments described above and herein, in the defined orientation the first ring gear may be aligned with the second ring gear.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
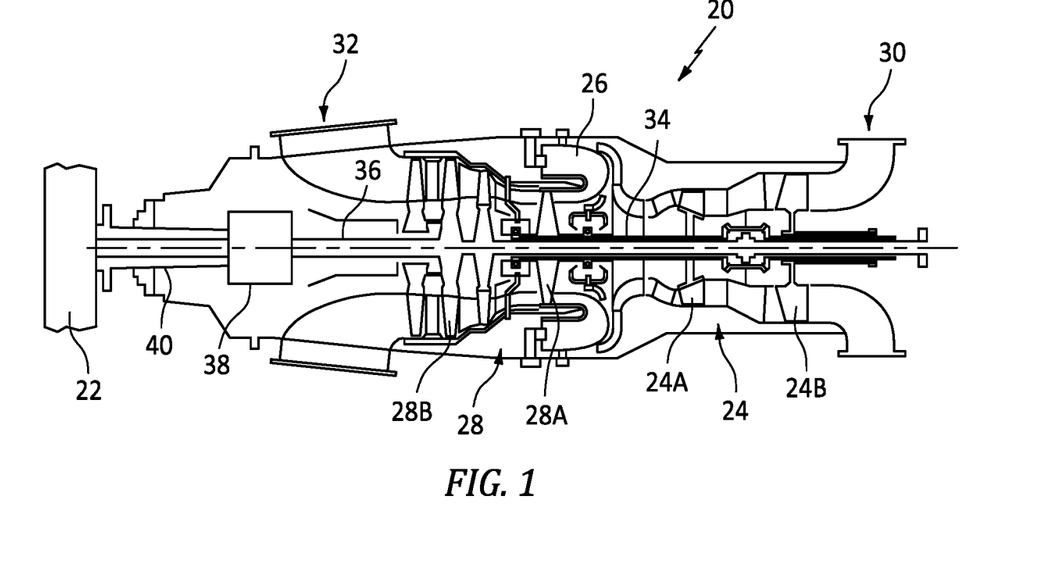
FIG. 1 is a schematic cross-sectional view of a gas turbine engine embodiment.

FIG. 1 illustrates a gas turbine engine 20 configured for driving a load 22, such as, but not limited to, a propeller or a helicopter rotor. Depending on the intended use, the engine 20 may be any suitable aircraft engine, and may be configured as a turboprop engine or a turboshaft engine. The gas turbine engine 20 generally comprises in serial flow communication a compressor section 24, a combustor 26, and a turbine section 28.

The exemplary engine 20 embodiment shown in FIG. 1 is a "reverse-flow" engine because gases flow from the inlet 30, at a rear portion of the engine 20, to the exhaust outlet 32, at a front portion of the engine 20. This is in contrast to "through-flow" gas turbine engines in which gases flow through the core of the engine 20 from a front portion to a rear portion. The engine 20 may be a reverse-flow engine (as illustrated) or a through-flow engine.

In the illustrated embodiment, the turbine section 28 has a high-pressure turbine 28A in communication with a high-pressure compressor 24A via a high-pressure 34, and a low-pressure turbine 28B in communication with a low-pressure compressor 24B via a low-pressure shaft 36. A reduction gearbox 38 is configured to connect the low-pressure shaft 36 to an output shaft 40 that is in driving engagement with a load 22 (e.g., a propeller, a helicopter rotor, or the like) while providing a reduction speed ratio therebetween.

Figure 2:
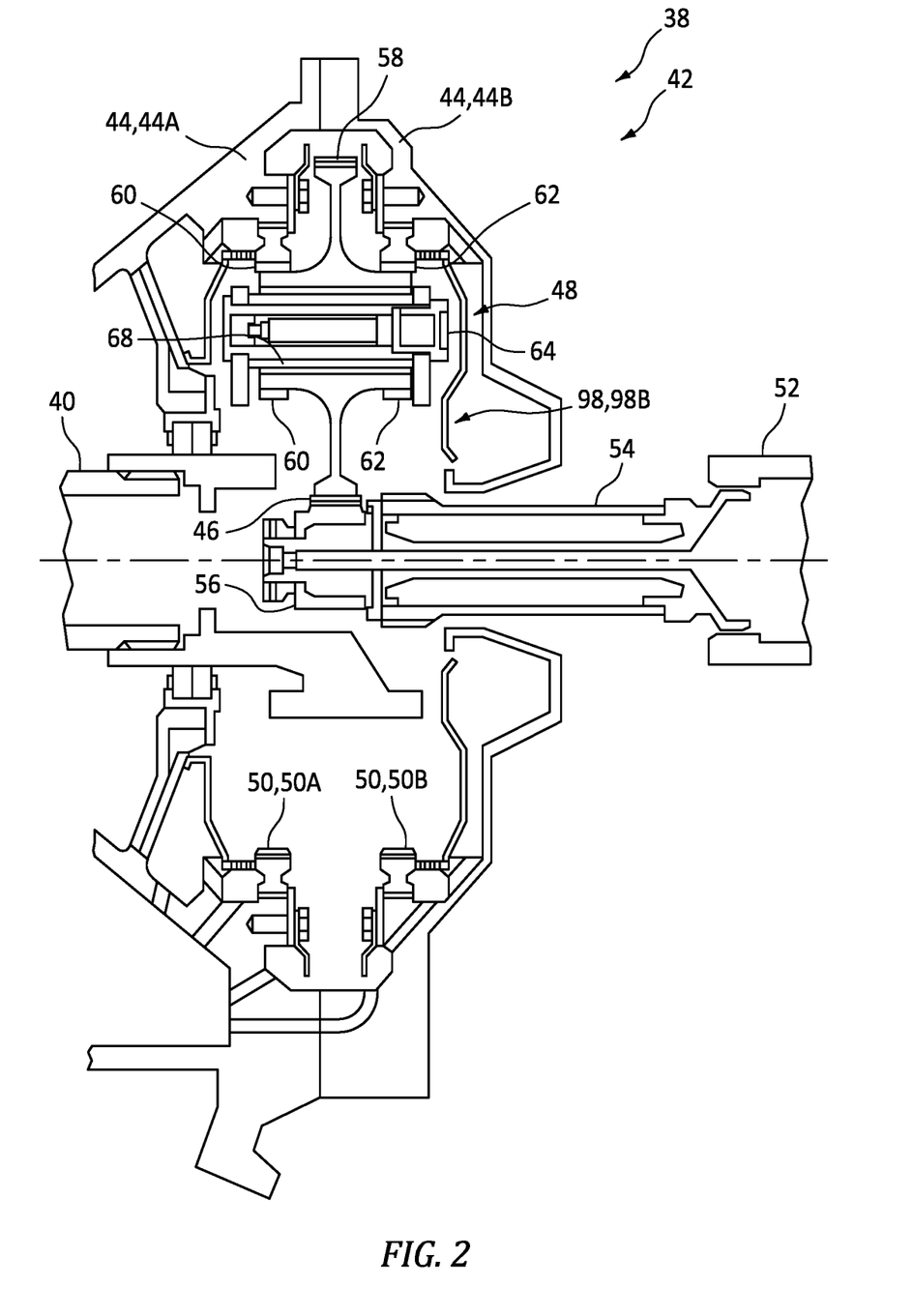
FIG. 2 is a diagrammatic cross-sectional view of a portion of a gas turbine engine like that shown in FIG. 1, illustrating a planetary gear arrangement.
Figure 3:
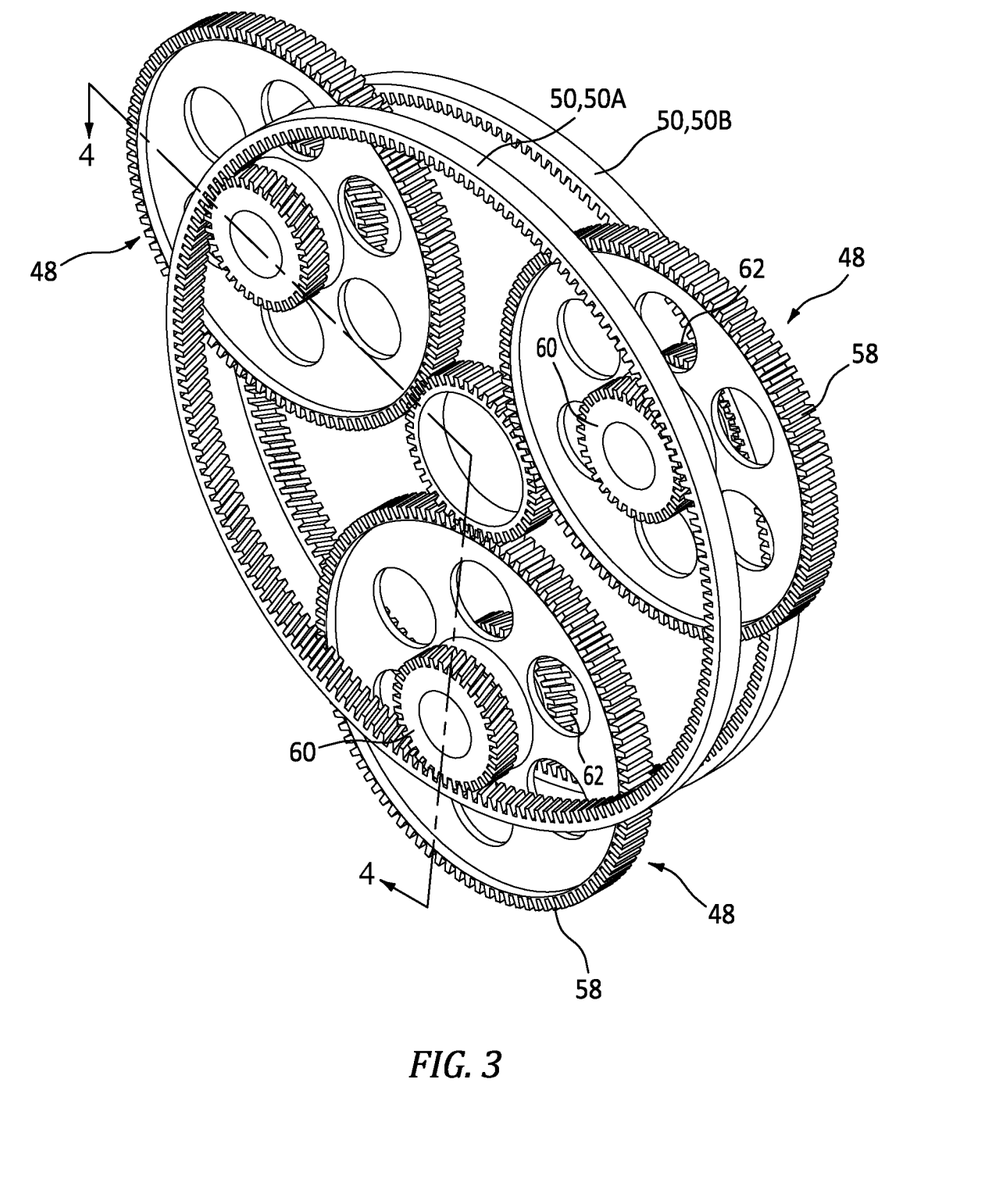
FIG. 3 is a diagrammatic perspective view of a planetary gear arrangement embodiment.
Figure 4:
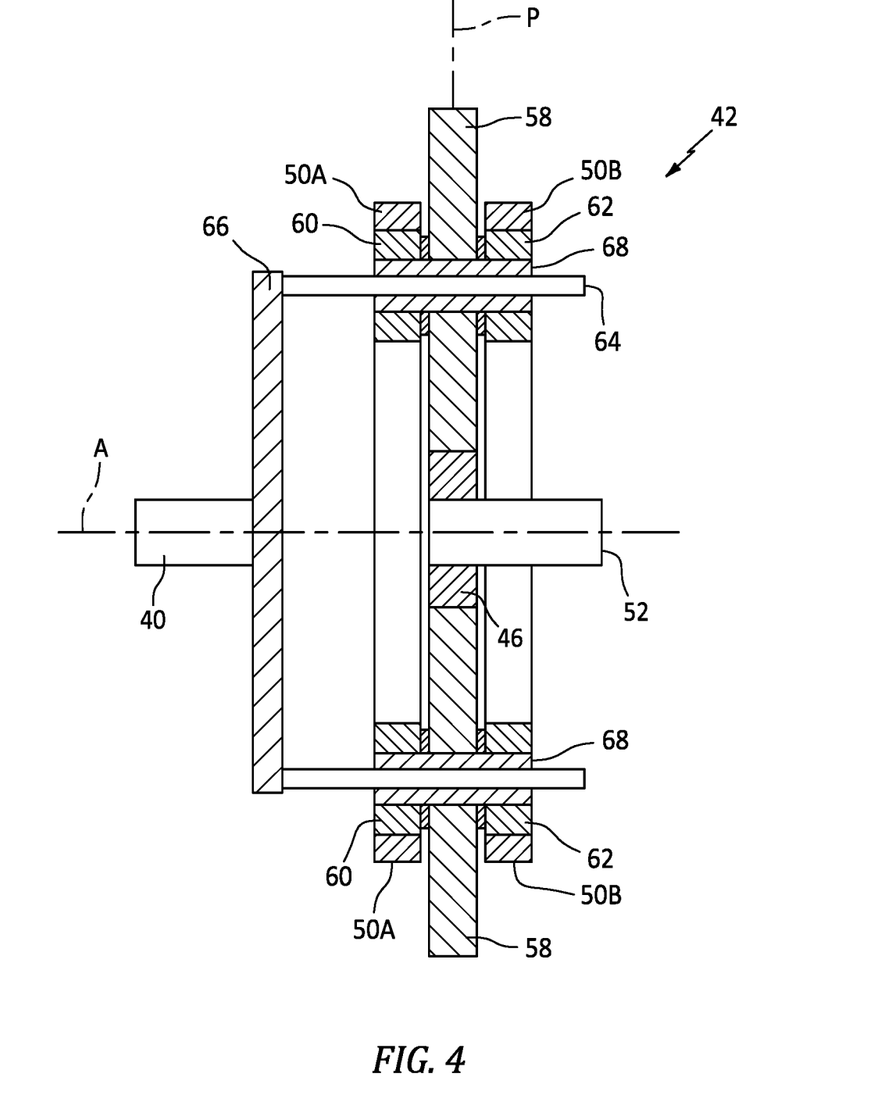
FIG. 4 is a diagrammatic sectional view along line 4-4 of the planetary gear arrangement shown in FIG. 3.

Referring to FIGS. 2-4, the reduction gearbox 38 comprises a planetary gear arrangement 42 disposed within a stationary casing 44. The casing 44 may be a multi-piece structure that is assembled to create a unitary casing 44. In the exemplary embodiment shown in FIG. 2, the casing 44 includes a fore casing section 44A and an aft casing section 44B. Mechanical fasteners may be used to attach the fore and aft casing sections 44A, 44B together. The present disclosure is not limited to a casing 44 having a pair of sections.

The planetary gear arrangement 42 (sometimes referred to as an epicyclic gear train, or an epicyclic gearbox, etc.) includes a sun gear 46, a plurality of planet gear assemblies 48, and a pair of ring gears 50; e.g., a fore ring gear 50A and an aft ring gear 50B. The planetary gear arrangement 42 is in communication with an input shaft 52 and an output shaft 40, and the input and output shafts 52, 40 may be disposed on the same rotational axis. The planetary gear arrangement 42 shown in FIGS. 2-4 includes a pair of ring gears 50A, 50B that are independent of one another. The planetary gear arrangement 42 allows the load 22 (see FIG. 1; e.g., a propeller, a rotor blade, or the like) to be driven at a given rotational speed, which is different than the rotational speed of the low-pressure shaft 36. In the embodiment shown, the reduction gearbox 38 is axially mounted at the front end of the engine 20. The casing 44 encloses the planetary gear arrangement 42 and is configured to accept an input shaft 52 and an output shaft 40 or components respectively in communication therewith. The input shaft 52 may be the low-pressure shaft 36 or may be an intermediary structure (e.g., an intermediary structure that includes a layshaft 54) in communication with the low-pressure shaft 36. The output shaft 40 may be a structure that is directly connected to the load 22 or may be an intermediary structure that is in communication with the load 22. The present disclosure is not limited to any particular output shaft 40 or input shaft 52 configuration. In those embodiments that include a layshaft 54, the layshaft 54 may be preassembled with the low-pressure shaft 36.

Figure 14:
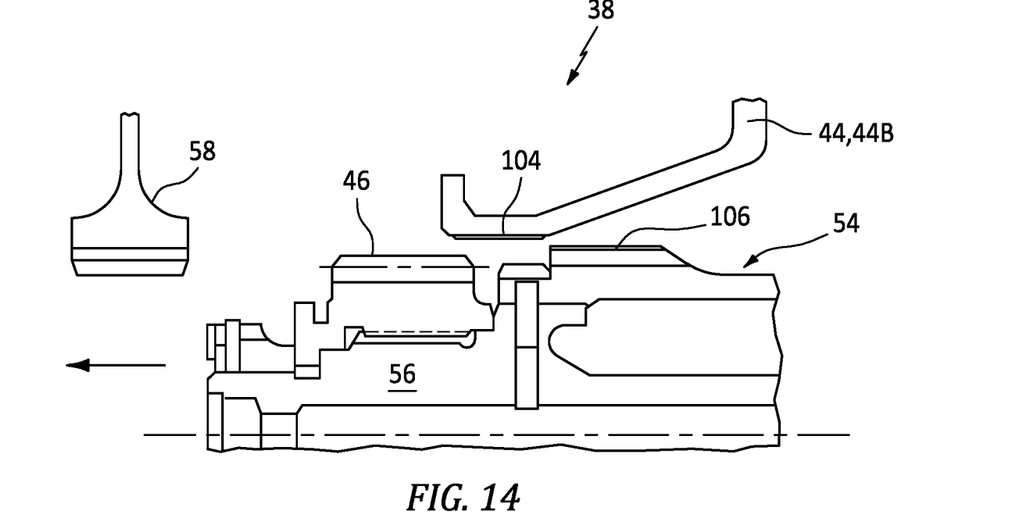
FIG. 14 is a diagrammatic partial view of a reduction gear box and a layshaft in an unassembled state.
Figure 14A:
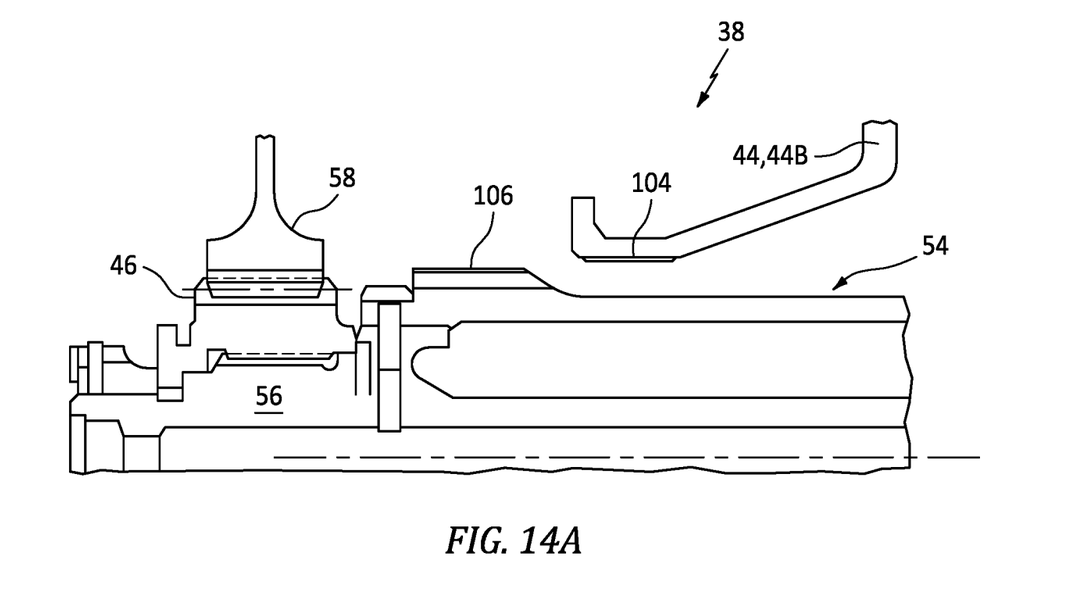
FIG. 14A is the diagrammatic partial view shown in FIG. 14, now shown in an assembled state.

FIG. 14 diagrammatically illustrates a portion of the layshaft 54 with the sun gear 46 mounted thereon, a portion of the aft casing section 44B, and a planet gear assembly main gear 58 in a disassembled state. FIG. 14A diagrammatically illustrates the element shown in FIG. 14, now shown in an assembled state. In terms of reduction gearbox 38/engine 20 assembly, the layshaft 54 may be considered as part of the engine 20. When the reduction gearbox 38 is assembled onto the engine 20, the reduction gearbox 38 may include an alignment feature (e.g., an alignment feature 104 disposed in aft casing section 44B) and the layshaft 54 may have an alignment feature 106 that cooperate to facilitate alignment between the layshaft 54 and the reduction gear box 38; e.g., so that the reduction gear box 38 centers on the center point of the layshaft 54. Properly centering the reduction gearbox 38 and the layshaft 54 ensures that the layshaft 54 engages appropriately between the various planet gear assemblies. The layshaft and gearbox alignment features 104, 106 are particularly useful since the reduction gearbox 38 installation onto the engine 20 is blind; i.e., there is no visual or physical access available as the casing sections 44A, 44B are being coupled. Once the layshaft 54 is centered, the reduction gearbox 38 continues to be inserted axially until sun gear 46 meshing initiates. At that point, a respective shaft can be slightly rotated to accomplish the aforesaid meshing.

The planetary gear arrangement 42 diagrammatically illustrated in FIGS. 2-4 and described herein includes three planet gear assemblies 48. Present disclosure planetary gear arrangement 42 embodiments may alternatively include fewer than three planet gear assemblies 48 or more than three planet gear assemblies 48. To facilitate the description herein, the present disclosure will be described in terms of three planet gear assemblies 48.

The sun gear 46 has a pitch diameter (PDSG) and is configured with teeth disposed circumferentially around its outer diameter. In some embodiments, the sun gear teeth may be configured as a spur gear. The sun gear 46 is in driving communication with the input shaft 52. For example, the sun gear 46 may be in communication with a sun gear connector 56, and the sun gear connector 56 may be connected with a layshaft 54 that is in communication with the low-pressure shaft 36. The layshaft 54 may be in splined communication with the low-pressure shaft 36. The present disclosure is not limited to any particular arrangement for providing driving communication between the sun gear 46 and the low-pressure shaft 36.

Figure 5:
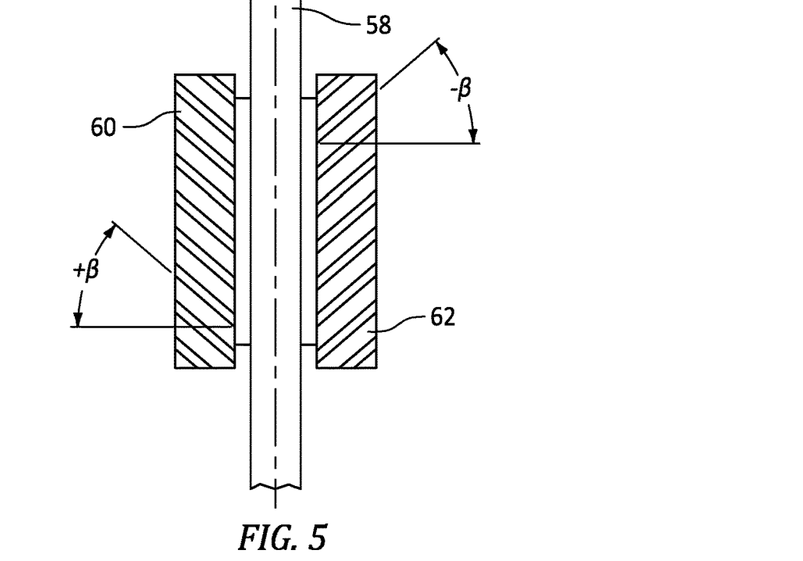
FIG. 5 is a diagrammatic sectional view of a planet gear assembly.

Each planet gear assembly 48 includes a main gear 58, a fore lateral gear 60, and an aft lateral gear 62. Each planet gear assembly 48 is rotatably mounted on a shaft 64. The fore and aft lateral gears 60, 62 are disposed on opposite sides of the main gear 58 and are attached to the main gear 58 such that the fore and aft lateral gears 60, 62 and the main gear 58 share a rotational axis and are driven together. The main gear 58 has a pitch diameter (PDMG) and the fore and aft lateral gears 60, 62 each have a pitch diameter (PDLG). In some embodiments, the fore and aft lateral gears 60, 62 and the main gear 58 may be a monolithic structure. In some embodiments, the fore and aft lateral gears 60, 62 may be independent elements that are attached to the main gear 58 to form a unitary structure. The main gear 58 of each planet gear assembly 48 is configured to mesh with the sun gear 46. In some embodiments, the main gear 58 may be configured as a spur gear configured to mesh with a sun gear 46 configured as a spur gear. In some embodiments, the fore lateral gear 60 of each respective planet gear assembly 48 may be configured as a helical gear configured to mesh with a respective fore ring gear 50A configured as a helical gear, and the aft lateral gear 62 of each respective planet gear assembly 48 may be configured as a helical gear configured to mesh with a respective aft ring gear 50B configured as a helical gear. In those embodiments wherein the fore and aft lateral gears 60, 62 are configured as helical gears, the teeth of the respective fore lateral gears 60 may be angled in a first orientation and the teeth of the respective aft lateral gears 62 may be angled in a second orientation, oppositely mirroring the first orientation; e.g., as diagrammatically shown in FIG. 5. FIG. 5 illustrates the teeth of a fore lateral gear 60 disposed in a first orientation with the teeth disposed at an angle +ß relative to the rotational axis of the planet gear assembly 48, and the teeth of an aft lateral gear 62 disposed in a second orientation with the teeth disposed at an angle −ß relative to the rotational axis of the planet gear assembly 48. In an alternative embodiment, the fore lateral gear 60 of each respective planet gear assembly 48 may be configured as a spur gear configured to mesh with a respective fore ring gear 50A configured as a spur gear, and the aft lateral gear 62 of each respective planet gear assembly 48 may be configured as a spur gear configured to mesh with a respective aft ring gear 50B configured as a spur gear.

In some embodiments (e.g., like that diagrammatically shown in FIG. 4), the shaft 64 of each planet gear assembly 48 may be connected to a planet carrier 66. In these embodiments, the planet gear assemblies 48 may be described as being mounted with the planet carrier 66. In some embodiments, the shaft 64 of at least one planet gear assembly 48 may not be connected to a planet carrier 66 and that planet gear assembly 48 is not mounted with the planet carrier 66. Each planet gear assembly 48 rotates relative to its respective shaft 64. A bearing 68 may be disposed between the shaft 64 and the respective planet gear assembly 48. The planet carrier 66 is configured to connect the planetary gear arrangement 42 to an output shaft 40 which is in turn connected to the load. The planet carrier 66 may be in direct communication with the output shaft 40 or maybe in indirect communication with an output shaft 40 via a connector. The present disclosure is not limited to any particular arrangement for connecting the planet carrier 66 with the output shaft 40 and not limited to any particular planet carrier 66 configuration.

Figure 6:
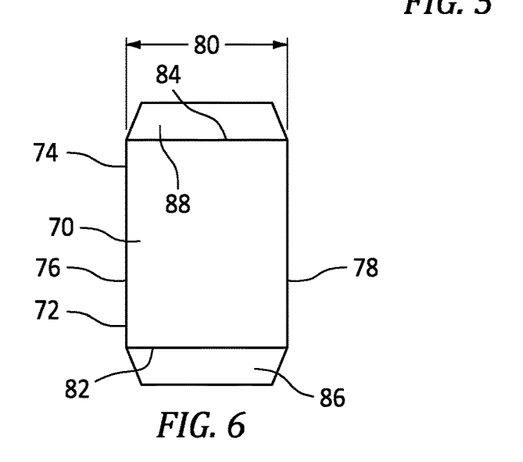
FIGS. 6 and 7 are diagrammatic cross-sectional view of ring gear embodiments.
Figure 7:
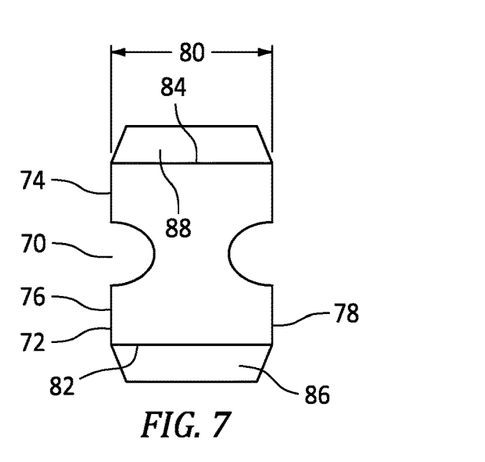

Referring to FIGS. 6 and 7, each ring gear 50 may have a body that includes a web 70, an inner rim 72, an outer rim 74, a first lateral side surface 76, a second lateral side surface 78, and a width 80. The width 80 extends between the lateral side surfaces 76, 78. The inner rim 72 is disposed radially inside of the outer rim 74. The web 70 extends between the inner and outer rims 72, 74. The inner rim 72 has an inner radial surface 82 and the outer rim 74 has an outer radial surface 84. The teeth 86 that mesh with the fore and aft lateral gears 60, 62 extend radially inwardly from the inner radial surface 82 and may be described as having a pitch diameter (PDRGFT). The present disclosure is not limited to any particular ring gear 50 configuration.

Figure 8:
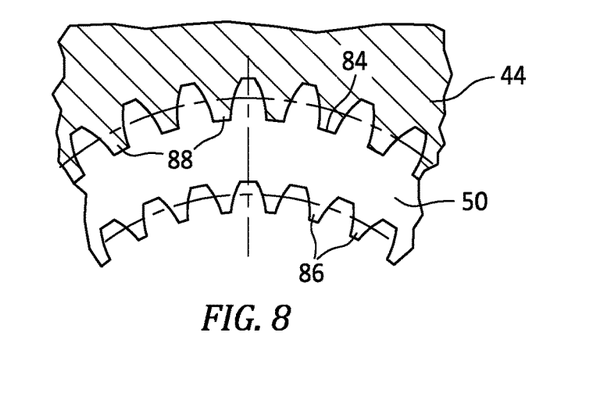
FIG. 8 is a diagrammatic view of a portion of a ring gear engaged with a reduction gearbox casing embodiment.
Figure 9:
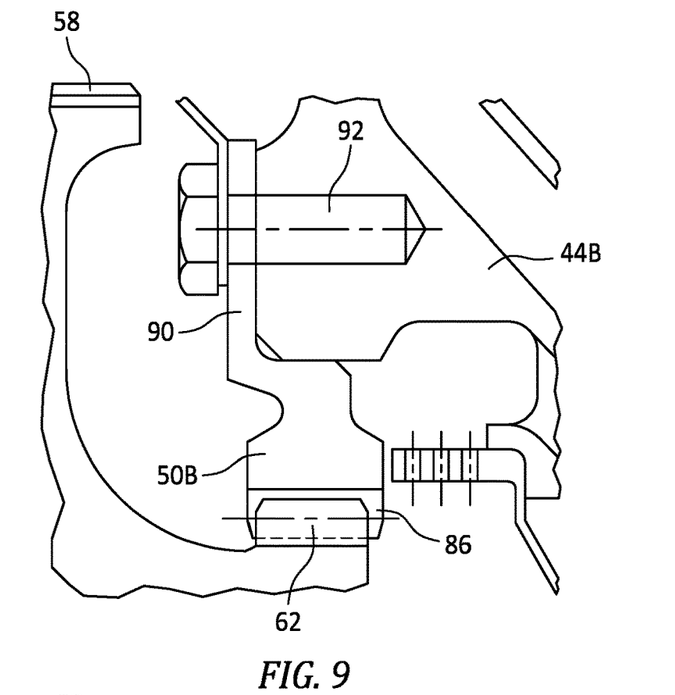
FIGS. 9 and 10 are enlarged views of ring gear embodiments engaged with the stationary casing.
Figure 10:
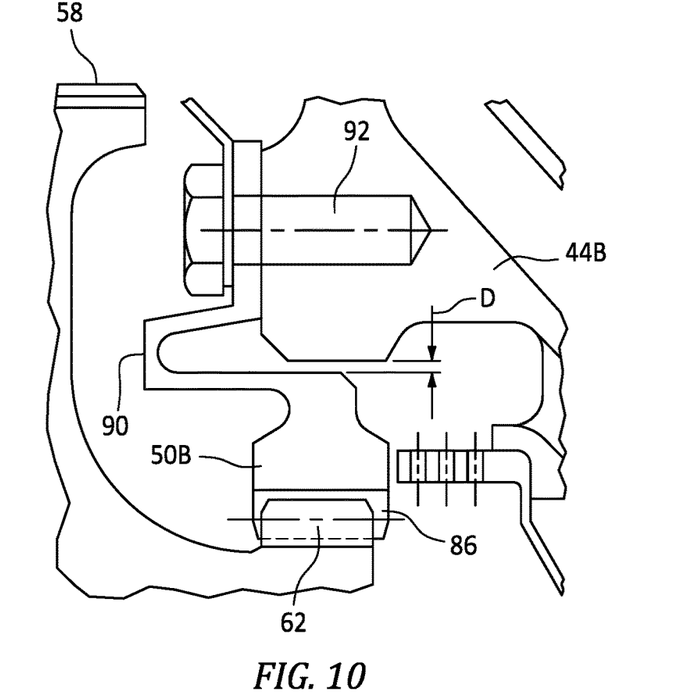

The ring gears 50A, 50B are rotationally fixed and the planet gear assemblies 48 rotate relative to the fixed ring gears 50A, 50B. A mechanical engagement between a respective ring gear 50A, 50B and the respective casing section 44A, 44B may be used to fix the respective ring gear 50A, 50B and the respective casing section 44A, 44B. For example, the casing section 44A, 44B may be configured to mate with a plurality of second teeth 88 extending radially outward from the outer radial surface 84 of the respective ring gear 50A, 50B to secure the respective ring gear 50A, 50B from rotating; e.g., see FIG. 8. As another example, one or more anti-rotation keys may engage the outer radial surface 84 with the casing section 44A, 44B to prevent rotation. FIGS. 9 and 10 illustrate examples of mechanical engagement wherein the aft ring gear 50B includes a plurality of flanges 90 and mechanical fasteners 92 are used to fix the ring gear 50A, 50B relative to the casing 44A, 44B. In the example shown in FIG. 9, the ring gear 50 body is positioned to abut the casing 44; i.e., an outer radial surface 84 of the ring gear 50 body is disposed contiguous with a casing 44A, 44B surface. This embodiment obviates the need to provide mechanical engagement features (e.g., teeth, keys/keyways) in the ring gear 50 and in the casing section 44A, 44B and obviates the need for independent retaining members. FIG. 10 illustrates another mechanical engagement example where the aft ring gear 50B includes a plurality of flanges 90 and mechanical fasteners 92 are used to attach the respective ring gear 50A, 50B to the respective casing section 44A, 44B. In this embodiment, the flange 90 is configured to radially separate the ring gear 50 body from the casing section 44A, 44B by a defined distance "D".

The sun gear 46, planet gear assemblies 48, and the ring gears 50A, 50B are arranged in a planetary or epicyclic arrangement. The sun gear 46 is disposed centrally with the planet gear assemblies 48 disposed radially outside of the sun gear 46. The main gear 58 of each planet gear assembly 48 is aligned with the sun gear 46 and meshes with the sun gear 46. The fore ring gear 50A is aligned with and meshes with the fore lateral gears 60 of the planet gear assemblies 48. The aft ring gear 50B is aligned with and meshes with the aft lateral gears 62 of the planet gear assemblies 48. Hence, the ring gears 50A, 50B are disposed symmetrically on each side of the main gears 58 so that the reaction load on the bearings 68 is equalized along the rotational axis of the respective planet gear assembly 48. By having two ring gears 50A, 50B disposed on opposite sides of the main gears 58, the load is symmetrically distributed relative to a plane P shown in FIG. 4, to which an axis of rotation A of the sun gear 46 is normal. Plane P is located halfway through a thickness of the main gears 58. By symmetrically distributing the load, the planetary gear arrangement 42 may be configured to withstand higher torques and may be configured to use a bearing 68 type (e.g., a journal bearing) that is lighter and less expensive than a rolling element bearing. In those embodiments wherein the lateral gears 60, 62 are helical gears with opposite orientations, during operation of the planetary gear arrangement 42, the lateral gears 60, 62 facilitate self-centering of the main gears 58 of the planet gear assemblies 48 under torque relative to the sun gear 46. This may enhance the load sharing between the ring gears 50A, 50B.

The pitch diameter (PDSG) of the sun gear 46 is inferior to the pitch diameter (PDMG) of the main gear 58 of each planet gear assembly 48. The pitch diameter of the lateral gears 60, 62 (PDLG) of a respective planet gear assembly 48 is inferior to the pitch diameter (PDMG) of the main gear 58 of that planet gear assembly 48. The pitch diameter of the lateral gears 60, 62 (PDLG) in each planet gear assembly 48 is inferior to the pitch diameter (PDRGFT) of the first teeth 86 of each ring gear 50A, 50B. As stated above, the present disclosure planetary gear arrangement 42 allows a load 22 (e.g., a propeller, a rotor blade, or the like) to be driven at a given rotational speed that is different from the rotational speed of the low-pressure shaft 36. More specifically, the respective pitch diameters of the planet gear assembly 48 components can be chosen for a given application that permits the gas turbine engine 20 to operate (i.e., low-pressure shaft 36 rotational speed) in a predetermined range that is optimal for the engine 20, and that permits the load 22 (e.g., propeller, rotor blade, and the like) to be driven in a predetermined range that is optimal for the load. In this manner, the planetary gear arrangement 42 can be configured to enable a propeller to be driven in a quieter mode.

Proper assembly of the reduction gearbox 38, specifically including assembly of the individual components of the planetary gear arrangement 42, is important to ensure proper component positioning and consequent proper gear meshing. Because each planet gear assembly 48 has two sets of teeth (i.e., main gear 58 and lateral gears 60, 62), there is most likely only one possible planet angular assembly position for each planet gear assembly 48 within the planetary gear arrangement 42 that provides the proper meshing with the sun and the ring gears 50A, 50B, since tooth count is made from a finite selection.

As indicated above, the ring gears 50A, 50B are rotationally fixed relative to the casing sections 44A, 44B and the planet gear assemblies 48 rotate relative to the fixed ring gears 50A, 50B. A plurality of second teeth 88 extending radially outwardly from the outer radial surface 84 of the respective ring gear 50A, 50B can be used to provide mechanical engagement between the respective casing section 44A, 44B and the respective ring gear 50A, 50B. As indicated above, however, the present disclosure is not limited to using teeth to create the aforesaid mechanical engagement. Other structures (e.g., keys, keyways, and the like) may be used alternatively. To facilitate the description herein, however, the ring gears 50A, 50B will be described as having second teeth 88 extending radially outwardly from the outer radial surface 84 of the respective ring gear 50A, 50B. The second teeth 88 may be configured as spur gear teeth or as helical gear teeth.

Figure 11:
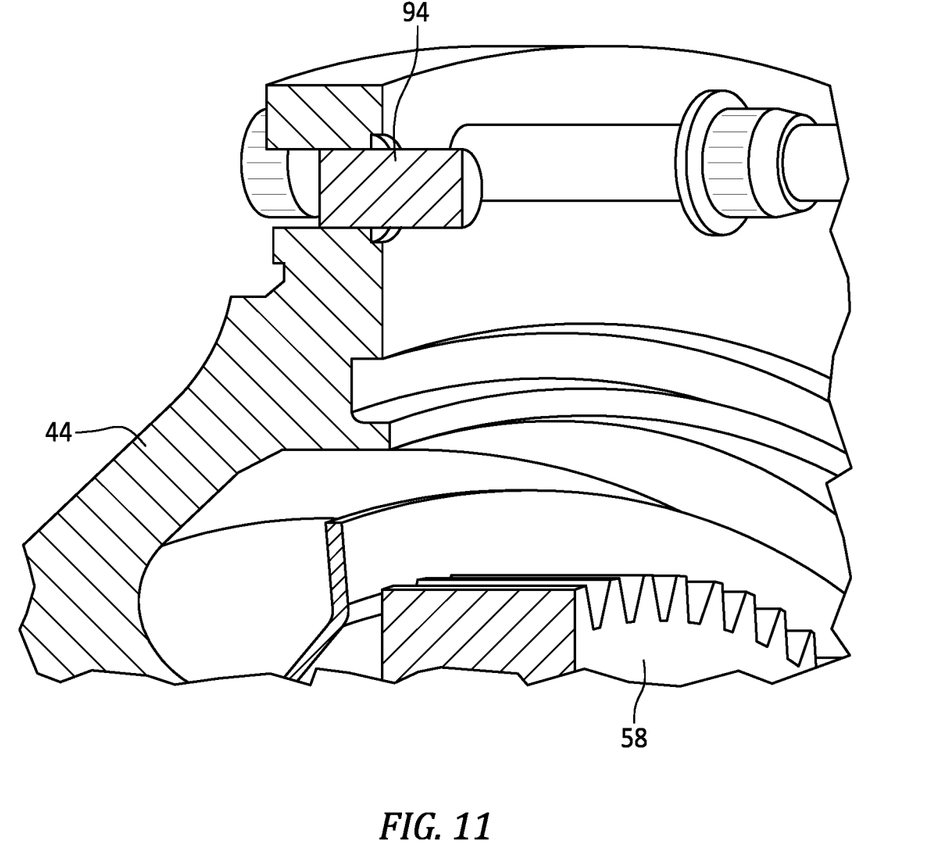
FIG. 11 is a diagrammatic sectional view of a casing section.

Embodiments of the present disclosure reduction gearbox 38 include fore and aft casing sections 44A, 44B having alignment features that are configured to facilitate relative alignment between the fore and aft casing sections 44A, 44B during coupling. The alignment features may be any feature that enables a party assembling the fore and aft casing sections 44A, 44B to determine the proper relative circumferential position of the casing sections. Non-limiting examples of acceptable alignment features include a mating feature such as one or more alignment pins 94 (e.g., see FIG. 11), a visible mark on a surface of a casing section, or a surface deformation (e.g., an indentation, an etching, or a machined feature, or material added to a surface, or the like), or any combination thereof. The present disclosure is not limited to any particular type of alignment feature.

Figure 12:
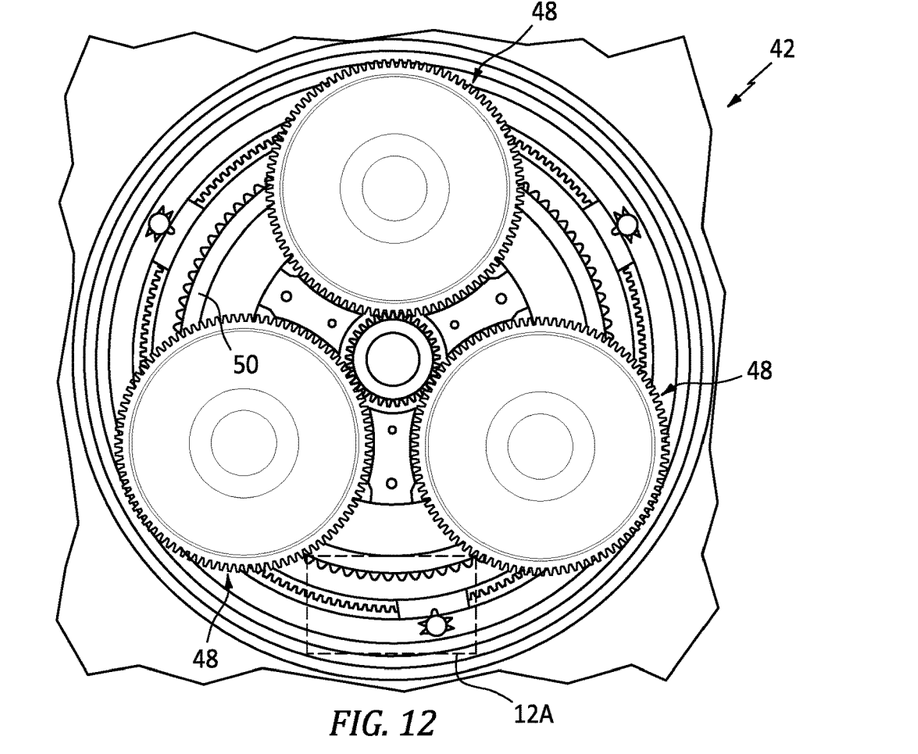
FIG. 12 is a diagrammatic planar view of a reduction gearbox embodiment.
Figure 12A:
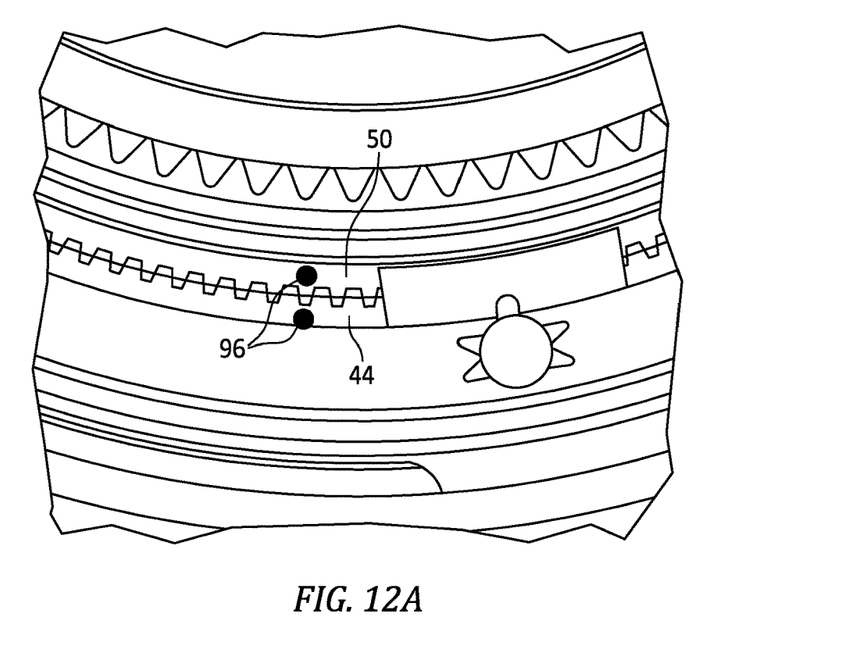
FIG. 12A is an enlarged portion of the reduction gearbox embodiment shown in FIG. 12.

Embodiments of the present disclosure reduction gearbox 38 include alignment features that are configured to identify a specific position of the fore casing section 44A relative to fore ring gear 50A, and a specific position of the aft casing section 44B relative to the aft ring gear 50B. In this manner, once the casing sections 44A, 44B are properly aligned relative to one another, the fore and aft ring gears 50A, 50B will be properly positioned relative to each other. Non-limiting examples of acceptable alignment features are described above. FIGS. 12 and 12A illustrate alignment dots 96 between a ring gear 50 and a casing section 44A, 44B. In those embodiments wherein a ring gear is attached to a casing section by flange and mechanical fastener, a master spline tooth can be used to achieve accurate angular positioning. For example, one of the splined components (internal or external spline) may have a tooth machined-off. On the mating spline member, the aligned tooth space may be left unmachined (i.e., collectively the master spline tooth). In this manner, there is only one angular position for assembly, and accurate angular positioning can be achieved. As another example, a dowel pin may be disposed in the casing section configured to mate with a hole in the ring gear flange to provide accurate angular positioning.

Figure 13:
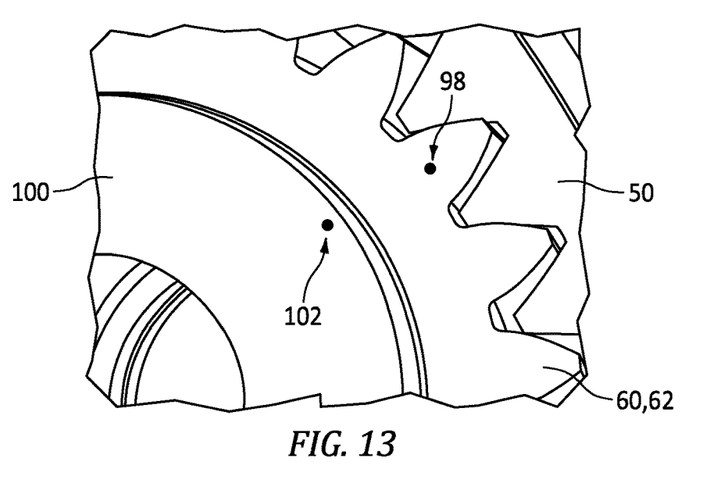
FIGS. 13-13B is diagrammatic perspective views of alignment between a planet gear assembly coupler and respective planet gear assemblies.
Figure 13A:
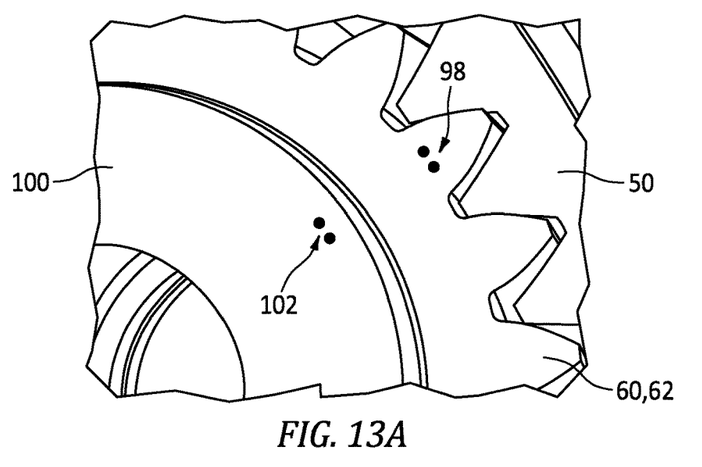
Figure 13B:
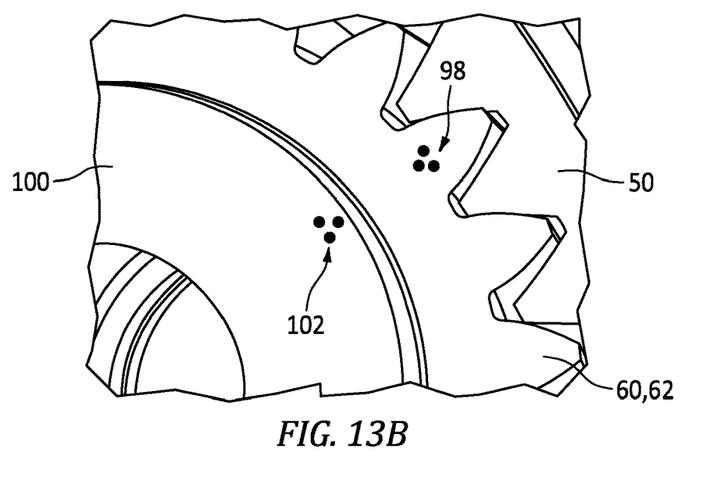

Because each planet gear assembly 48 has two sets of teeth (main gear 58 and fore and aft lateral gears 60, 62) there is most likely only one possible planet angular assembly position for each planet gear assembly 48 relative to the other planet gear assemblies 48 so that all of the planet gear assemblies 48 properly mesh with the sun and the ring gears 46, 50A, 50B, since tooth count is made from a finite selection. Embodiments of the present disclosure system include alignment features that facilitate "planetary" or "angular" alignment of the planet gear assemblies 48 relative to each other and relative to the ring gears 50A, 50B. For example, each respective planet gear assembly 48 may include an alignment feature 98 that distinguishes that planet gear assembly 48 from the other planet gear assemblies 48, and a planet carrier 66, or an assembly jig replicating the planet carrier, or the like (generically referred to herein as a "planet gear coupler" or a "PGA coupler 100") may also include a mating alignment feature 102 for each respective planet gear assembly 48. FIGS. 13-13B illustrates a single dot 102 on the PGA coupler 100 and a single dot 98 on a first of the planet gear assemblies 48 (FIG. 13), a pair of dots 102 on the PGA coupler 100 and a pair of dots 98 on a second of the planet gear assemblies 48 (FIG. 13A), and three dots 102 on the PGA coupler 100 and three dots 98 on a third of the planet gear assemblies 48 (FIG. 13B). In this manner each of the planet gear assemblies 48 can be positioned according to their proper planetary/angular position, and the planet gear assemblies 48 will consequently, collectively be positioned for engagement with each respective ring gear 50A, 50B. In some embodiments, a sun gear jig (not shown) with the respective alignment features may be used as an alternative to the PGA coupler 100, and/or may be used to maintain the specific planetary/angular alignment of the planet gear assemblies 48.

An example of how the alignment features described above may be used during assembly of the reduction gearbox 38 is provided hereinafter to illustrate at least some of the benefits provided. The alignment features 94 of the fore and aft casing sections 44A, 44B are used to establish proper relative circumferential position of the fore and aft casing sections 44A, 44B. As will be noted hereinafter, in those embodiments wherein the ring gears 50A, 50B/lateral gears 60, 62 include helical gear teeth, the proper relative circumferential position of the fore and aft casing sections 44A, 44B may require some amount of circumferential rotation attributable to the engagement between mating helical ring and lateral gears 50, 60, 62 as the assembly of the reduction gearbox 38 is completed.

The fore ring gear 50A is mounted within the fore casing section 44A using their relative alignment features 96, and the aft ring gear 50B is mounted within the aft casing section 44B using their relative alignment features 96. The planet gear assemblies 48 of the planetary gear arrangement 42 are positioned relative to each other using the alignment features 98, 102 associated with each planet gear assembly 48 and the PGA coupler 100. The positioned planet gear assemblies 48 are disposed between the fore casing section 44A and the aft casing section 44B. The lateral gears 60, 62 of the planet gear assemblies 48 are engaged with the fore ring gear 50A.

In those embodiments wherein the ring gears 50A, 50B and the lateral gears 60, 62 are spur gears, the fore and aft casing sections 44A, 44B may be drawn toward each other with the alignment features of the fore and aft casing sections 44A, 44B aligned with one another. For example, if the alignment features 94 of the fore and aft casing sections 44A, 44B include one or more alignment pins, the aforesaid alignment pins may be inserted and the fore and aft casing sections 44A, 44B may be drawn towards each other along the alignment pins. As the aft casing section 44B and aft ring gear 50B are drawn more closely, the spur gear teeth of the planet gear assemblies 48 are drawn into engagement with the aft ring gear 50B. The fore and aft casing sections 44A, 44B may be subsequently attached to one another by mechanical fasteners.

In those embodiments wherein the ring gears 50A, 50B and the lateral gears 60, 62 are helical gears, the assembly must consider that some amount of rotation of at least one of the casing sections 44A, 44B (or the planetary gear arrangement 42) may be required to permit the helical teeth to mesh. As an example, the aft casing section 44B (with the aft ring gear 50B mounted thereto) may be drawn toward the fore casing section 44A and mounted fore ring gear 50A with the planet gear assemblies 48 (positioned relative to one another) already engaged with the fore ring gear 50A. As the aft casing section 44B and aft ring gear 50B are drawn more closely, the helical gear teeth of the planet gear assemblies 48 are drawn into engagement with the helical gear teeth of the aft ring gear 50B. To permit the lateral gears 60, 62 to mesh with the aft ring gear 50B, some amount of rotation of the aft ring gear 50B and aft casing section 44B will be required. In this process, alignment features of the fore and aft casing sections 44A, 44B are monitored to ensure that upon coupling of the fore and aft casing sections 44A, 44B together, the aforesaid casing section alignment features 94 are properly aligned. Once the fore and aft casing sections 44A, 44B are coupled in proper alignment, mechanical fasteners may be used to attach the fore and aft casing sections 44A, 44B together.

As another example, the casing sections 44A, 44B may be aligned with, but separated from, each other using their alignment features 94; e.g., temporary alignment pins. The aft casing section 44B (with aft ring gear 50B mounted thereto) is drawn a distance toward the fore casing section 44A with the mounted fore ring gear 50A with the planet gear assemblies 48 (positioned relative to one another) already engaged with the fore ring gear 50A. In this example, the fore and aft casing sections 44A, 44B are drawn toward one another without rotation. Once the aft casing section 44B is positioned a distance from the fore casing section 44A, movement of the aft casing section 44B toward the fore casing section 44A is halted. This distance is typically approximately the width of a lateral gear 60, 62. At this point, the planetary gear arrangement 42 (with its relatively positioned planet gear assemblies 48) is moved away from fore ring gear 50A, thereby decreasing the amount of engagement between the fore lateral gears 60 and the fore ring gear 50A. This movement of the planetary gear arrangement 42 will necessarily require some amount of rotation of the planetary gear arrangement 42 due to the helical teeth of the fore ring gear 50A and the fore lateral gears 60. The planetary gear arrangement 42 is moved/rotated until the helical teeth of the aft lateral gears 62 are aligned with the helical teeth of the aft ring gear 50B, while maintaining alignment between the helical teeth of the fore lateral gears 60 and the helical teeth of the fore ring gear 50A. The aft casing section 44B is then moved toward the fore casing section 44A until coupled. During this movement, the planetary gear arrangement 42 (with its planet gear assemblies 48 still properly positioned relative to one another) with rotate some amount while the helical teeth of the aft lateral gear 62 mesh with the helical teeth of the aft ring gear 50B, and the helical teeth of the fore lateral gear 60 mesh with the helical teeth of the fore ring gear 50A. In those embodiments that use the PGA coupler 100 to properly position the planet gear assemblies 48 relative to one another, the PGA coupler 100 may be configured to provide an indication of how much the planetary gear arrangement 42 is moved away from the fore ring gear 50A toward the aft ring gear 50B to permit simultaneous engagement of the planetary gear arrangement 42 with the ring gears 50A, 50B. Once the lateral gears 60, 62 of the planet gear assemblies 48 are properly seated within the respective ring gears 50A, 50B and the casing sections 44A, 44B are coupled in proper alignment, mechanical fasteners may be used to attach the fore and aft casing sections 44A, 44B together.

Some of the assembly examples provided above describe the assembly in terms of the aft casing section 44B moving toward the fore casing section 44A during assembly. The present disclosure assembly procedures are not limited thereto; e.g., the assembly process may include moving the fore casing section 44A toward the aft casing section 44B during assembly. In addition, the assembly is described herein in terms of steps. The described order of steps is provided to give an example of how the assembly may be performed. The present disclosure is not limited to the order of steps described herein.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of assembling a reduction gearbox, comprising:
   aligning a first ring gear with a second ring gear by mounting the first ring gear in a first casing section in a first predetermined position and mounting the second ring gear in a second casing section in a second predetermined position, wherein the first casing section and second casing section are configured to mate with one another in a defined orientation;
   angularly aligning a plurality of planet gear assemblies relative to one another, each planet gear assembly having a main gear, a first lateral gear, and a second lateral gear coupled to one another;
   disposing the aligned planet gear assemblies between the first casing section and second casing section; and
   coupling the first casing section and second casing section together in the defined orientation with the first lateral gears meshed with the first ring gear and the second lateral gears meshed with the second ring gear.

2. The method of claim 1, wherein the first ring gear is aligned with the second ring gear when the first casing section and second casing section are mated in the defined orientation.

3. The method of claim 1, wherein the first ring gear (FRG) includes a FRG alignment feature and the first casing section (FCS) includes an FCS alignment feature; and in the first predetermined position, the FRG alignment feature and the FCS alignment feature are aligned with one another; and wherein second ring gear (SRG) includes a SRG alignment feature and the second casing section (SCS) includes a SCS alignment feature; and in the second predetermined position, the SRG alignment feature and the SCS alignment feature are aligned with one another.

4. The method of claim 3, wherein in the defined orientation with the first casing section and second casing section mated with one another, the first ring gear and the second ring gear are aligned to receive the plurality of planet gear assemblies.

5. The method of claim 4, wherein the FRG alignment feature and the FCS alignment feature are visually identifiable.

6. The method of claim 4, wherein the SRG alignment feature and the SCS alignment feature are visually identifiable.

7. The method of claim 3, wherein the first ring gear and the first casing section are mechanically engaged with one another, and the second ring gear and the second casing section are mechanically engaged with one another.

8. The method of claim 7, wherein a first set of teeth mechanically engage the first ring gear and the first casing section, and a second set of teeth mechanically engage the second ring gear and the second casing section.

9. The method of claim 1, wherein the step of angularly aligning the plurality of planet gear assemblies relative to one another includes connecting each said planet gear assembly to a coupler.

10. The method of claim 9, wherein the plurality of planet gear assemblies includes N number of planet gear assemblies, wherein N is an integer greater than one; and wherein the coupler (CPL) includes an N number of CPL alignment features, each respective one of the N number of CPL alignment features associated with a respective one of the N number of planet gear assemblies, and each said planet gear assembly (PGA) includes a PGA alignment feature; and wherein the step of angularly aligning the plurality of planet gear assemblies relative to one another includes connecting each said planet gear assembly to the coupler such that each respective CPL alignment feature is aligned with the PGA alignment feature of the associated said planet gear assembly.

11. The method of claim 10, wherein the CPL alignment features and the PGA alignment features are visually identifiable.

12. The method of claim 10, wherein the coupler is a planet carrier.

13. The method of claim 10, wherein the coupler is an assembly jig.

14. A system for assembling a reduction gearbox, comprising:

a casing with a first casing section (FCS) that mates with a second casing section (SCS), wherein the first casing section includes an FCS alignment feature, and the second casing section includes a SCS alignment feature, wherein the first casing section and the second casing section are configured to mate in a defined orientation, and in the defined orientation, the FCS alignment feature and the SCS alignment feature are aligned with one another;

wherein the first casing section includes a first casing ring gear alignment feature and the second casing section includes a second casing ring gear alignment feature;

a first ring gear (FRG) configured for mechanical engagement with the first casing section, the first ring gear having a FRG alignment feature;

a second ring gear (SRG) configured for mechanical engagement with the second casing section, the second ring gear having a SRG alignment feature;

wherein in the defined orientation, the first ring gear is engaged with the first casing section with the first casing ring gear alignment feature and the FRG alignment feature are aligned with one another, and the second ring gear is engaged with the second casing section with the second casing ring gear alignment feature and the SRG alignment feature are aligned with one another;

a plurality of planet gear assemblies (PGA), each having a main gear, a first lateral gear, a second lateral gear coupled to one another, and each said planet gear assembly (PGA) including a PGA alignment feature; and a coupler (CPL) configured to angularly align the plurality of planet gear assemblies relative to one another, the coupler having a CPL alignment feature for each respective planet gear assembly that is distinguishable from the CPL alignment feature for the other planet gear assemblies, wherein the plurality of planet gear assemblies are angularly aligned when the CPL alignment feature for each respective planet gear assembly is aligned with the PGA alignment feature for that respective planet gear assembly.

15. The system of claim 14, wherein in the defined orientation the first ring gear is aligned with the second ring gear.

16. The system of claim 15, wherein the coupler is a planet carrier.

17. The system of claim 15, wherein the coupler is an assembly jig.

* * * * *